(12) United States Patent
Chinnathambi et al.

(10) Patent No.: US 7,922,926 B2
(45) Date of Patent: *Apr. 12, 2011

(54) COMPOSITION AND METHOD FOR POLISHING NICKEL-PHOSPHOROUS-COATED ALUMINUM HARD DISKS

(75) Inventors: Selvaraj Palanisamy Chinnathambi, Taman Jurong (SG); Ping-Ha Yeung, Singapore (SG); Brian Reiss, Woodridge, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 604 days.

This patent is subject to a terminal disclaimer.

(21) Appl. No.: 11/970,978

(22) Filed: Jan. 8, 2008

(65) Prior Publication Data
US 2009/0173717 A1    Jul. 9, 2009

(51) Int. Cl.
*C03C 15/00*    (2006.01)
(52) U.S. Cl. ....... 216/67; 252/79.1; 252/79.2; 252/79.3; 252/79.4; 216/37; 438/689; 438/692
(58) Field of Classification Search ........ 252/79.1–79.4; 438/689–692
See application file for complete search history.

(56) References Cited

U.S. PATENT DOCUMENTS

| | | | |
|---|---|---|---|
| 5,783,489 A | 7/1998 | Kaufman et al. | |
| 5,858,813 A | 1/1999 | Scherber et al. | |
| 6,280,490 B1 | 8/2001 | Rader et al. | |
| 6,350,393 B2 | 2/2002 | Francis et al. | |
| 6,376,381 B1 | 4/2002 | Sabde | |
| 6,428,721 B1 | 8/2002 | Ina et al. | |
| 6,432,828 B2 | 8/2002 | Kaufman et al. | |
| 6,439,965 B1 | 8/2002 | Ichino et al. | |
| 6,440,186 B1 | 8/2002 | Sakai et al. | |
| 6,454,819 B1 | 9/2002 | Yano et al. | |
| 6,468,913 B1 | 10/2002 | Pasqualoni et al. | |
| 6,488,729 B1 | 12/2002 | Ishitobi et al. | |
| 6,541,384 B1 | 4/2003 | Sun et al. | |
| 6,569,216 B1 | 5/2003 | Taira et al. | |
| 6,604,987 B1 | 8/2003 | Sun | |
| 6,607,571 B2 | 8/2003 | Ishitobi et al. | |
| 6,620,037 B2 | 9/2003 | Kaufman et al. | |
| 6,641,630 B1 | 11/2003 | Sun | |
| 6,645,051 B2 | 11/2003 | Sugiyama et al. | |
| 6,677,239 B2 | 1/2004 | Hsu et al. | |
| 6,896,591 B2 | 5/2005 | Chaneyalew et al. | |
| 6,910,952 B2 | 6/2005 | Suenaga et al. | |
| 6,936,543 B2 | 8/2005 | Schroeder et al. | |
| 7,014,534 B2 | 3/2006 | Oshima et al. | |
| 7,097,541 B2 | 8/2006 | DeRege Thesauro et al. | |
| 7,220,676 B2 | 5/2007 | Hagihara et al. | |
| 7,442,645 B2 * | 10/2008 | Carter et al. | 438/690 |
| 2001/0049910 A1 | 12/2001 | Kaufman et al. | |
| 2001/0051433 A1 | 12/2001 | Francis et al. | |
| 2001/0051746 A1 | 12/2001 | Hagihara et al. | |
| 2002/0168923 A1 | 11/2002 | Kaufman et al. | |
| 2003/0040182 A1 | 2/2003 | Hsu et al. | |
| 2003/0041526 A1 | 3/2003 | Fujii et al. | |
| 2003/0181142 A1 | 9/2003 | De Rege Thesauro et al. | |
| 2003/0228763 A1 | 12/2003 | Schroeder et al. | |
| 2004/0092103 A1 | 5/2004 | Fujii et al. | |
| 2004/0157535 A1 | 8/2004 | Chaneyalew et al. | |
| 2004/0266323 A1 | 12/2004 | Oshima et al. | |
| 2005/0009322 A1 | 1/2005 | Matsui et al. | |
| 2005/0132660 A1 | 6/2005 | Fujii et al. | |
| 2005/0260390 A1 | 11/2005 | Croft | |
| 2006/0024967 A1 * | 2/2006 | De Rege Thesauro et al. | 438/692 |
| 2006/0096496 A1 * | 5/2006 | Sun et al. | 106/3 |

FOREIGN PATENT DOCUMENTS

JP    2001-62704 A    3/2001

* cited by examiner

*Primary Examiner* — Nadine G Norton
*Assistant Examiner* — Maki A Angadi
(74) *Attorney, Agent, or Firm* — Thomas E. Omholt; Francis J. Koszyk; Steven D. Weseman

(57) ABSTRACT

The invention provides a chemical-mechanical polishing composition consisting essentially of fumed alumina, alpha alumina, silica, a nonionic surfactant, an additive compound selected from the group consisting of glycine, alanine, iminodiacetic acid, and maleic acid, hydrogen peroxide, and water. The invention further provides a method of chemically-mechanically polishing a substrate comprising contacting a substrate with a polishing pad and the chemical-mechanical polishing composition, moving the polishing pad and the polishing composition relative to the substrate, and abrading at least a portion of the substrate to polish the substrate.

22 Claims, No Drawings

COMPOSITION AND METHOD FOR POLISHING NICKEL-PHOSPHOROUS-COATED ALUMINUM HARD DISKS

BACKGROUND OF THE INVENTION

The demand for increased storage capacity in memory or rigid disks and the trend towards miniaturization of memory or rigid disks (due to the requirement for smaller hard drives in computer equipment) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

As the demand for increased storage capacity has increased, so has the need for improved processes for the polishing of such memory or rigid disks. The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material. The planarity of the memory or rigid disks must be improved, as the distance between the recording head of a disk drive and the surface of the memory or rigid disk has decreased with improvements in recording density that demand lower flying height of the magnetic head with respect to the memory or rigid disk. In order to permit lower flying height of the magnetic head, improvements to the surface finish of the memory or rigid disk are required.

Surface characteristics of memory or rigid disks affecting the flying height of the magnetic head include waviness, microwaviness, and surface roughness. Waviness or warp is a gross deviation from flatness over the entire disk surface. Waviness is generally due to the fact that the disk is readily susceptible to warping as a result of its very thin, annular shape, and to various internal stresses introduced during formation of the disk. An intermediate form of surface deviation, herein referred to as microwaviness, may exist. Microwaviness is the disk surface distortion that has a frequency higher than two cycles per revolution and less than three cycles per recording head length. As used herein, microwaviness is a waviness of a disk surface for a range of wavelengths that are on the order of the length of the transducing head. Using current head technology, these wavelengths are approximately in the range of 10 to 5000 microns. For low flying head heights, microwaviness can create an airbearing resonance, thereby causing excessive head to disk spacing modulation. Surface roughness is a surface characteristic at yet smaller wavelengths. The spacing modulation resulting from microwaviness can cause poor overwriting of data on the disk surface, and in some cases can even cause collision of the head with the disk surface with resulting damage to the disk surface and/or the recording head.

Thus, there remains a need in the art for polishing compositions and methods that exhibit reduced microwaviness in memory or rigid disks.

BRIEF SUMMARY OF THE INVENTION

The invention provides a chemical-mechanical polishing composition consisting essentially of or consisting of (a) fumed alumina, (b) alpha alumina, (c) silica, (d) about 10 to about 1000 ppm of a nonionic surfactant, (e) about 0.8 wt. % to about 1.5 wt. % of an additive compound selected from the group consisting of glycine, alanine, iminodiacetic acid, and maleic acid, (f) hydrogen peroxide, (g) optionally a biocide, and (h) water. The invention further provides a method of chemically-mechanically polishing a substrate comprising (i) contacting a substrate with a polishing pad and a chemical-mechanical polishing composition consisting essentially of or consisting of (a) fumed alumina, (b) alpha alumina, (c) silica, (d) about 10 to about 1000 ppm of a nonionic surfactant, (e) about 0.8 wt. % to about 1.5 wt. % of an additive compound selected from the group consisting of glycine, alanine, iminodiacetic acid, and maleic acid, (f) hydrogen peroxide, (g) optionally a biocide, and (h) water, (ii) moving the polishing pad and the polishing composition relative to the substrate, and (iii) abrading at least a portion of the substrate to polish the substrate.

DETAILED DESCRIPTION OF THE INVENTION

The invention provides a chemical-mechanical polishing composition consisting essentially of or consisting of (a) fumed alumina, (b) alpha alumina, (c) silica, (d) about 10 to about 1000 ppm of a nonionic surfactant, (e) about 0.8 wt. % to about 1.5 wt. % of an additive compound selected from the group consisting of glycine, alanine, iminodiacetic acid, and maleic acid, (f) hydrogen peroxide, (g) optionally a biocide, and (h) water. The polishing composition desirably allows for reduced microwaviness in the polishing of metal surfaces such as the surface of memory or rigid disks.

The polishing composition contains a mixture of fumed alumina, alpha alumina, and silica. Fumed alumina can be prepared from any suitable volatile or nonvolatile precursor. Fumed alumina can be produced from volatile precursors by hydrolysis and/or oxidation of the precursors (e.g., aluminum chloride) in a high temperature flame ($H_2$/air or $H_2/CH_4$/air) to produce the fumed alumina. Fumed alumina can be prepared from nonvolatile precursors by dissolving or dispersing the precursor in a suitable solvent such as water, alcohol, or acid-based solvent. The solution containing the precursor can be sprayed into a high temperature flame using a droplet generator, and the alumina aggregate then can be collected. Typical droplet generators include bi-fluid atomizers, high pressure spray nozzles, and ultrasonic atomizers.

Fumed alumina is an amorphous form of aluminum oxide, whereas alpha alumina refers to a crystalline polymorph of aluminum oxide formed at high temperatures above 1400° C. Alpha alumina typically refers to alumina comprising about 50 wt. % or more of the alpha polymorph. Fumed alumina is typically less abrasive than alpha alumina. Both forms of alumina are well known in the art and available commercially in a wide range of particle sizes and surface areas.

The silica can be any suitable form of silica. Preferably, the silica is colloidal silica. Suitable colloidal silica in the context of the invention includes wet-process type silica particles, for example, precipitated or condensation-polymerized silica particles, with condensation-polymerized silica particles being preferred. Condensation-polymerized silica particles typically are prepared by condensing $Si(OH)_4$ to form particles having an average particle size between about 1 nm and about 1000 nm. Such abrasive particles can be prepared in accordance with U.S. Pat. No. 5,230,833 or can be obtained as any of various commercially available products, such as the Akzo-Nobel Bindzil 50/80 product and the Nalco 1050, 2327, and 2329 products, as well as other similar products available from DuPont, Bayer, Applied Research, Nissan Chemical, and Clariant.

The abrasive particles useful in the invention, i.e., the fumed alumina, alpha alumina, and silica, desirably have an average particle size specific to each of the abrasives comprising the particles. The fumed alumina desirably has an average particle size of about 50 nm or more (e.g., about 60 nm or more, or about 75 nm or more, or about 90 nm or more). Alternatively or in addition, the fumed alumina desirably has an average particle size of about 250 nm or less (e.g., about 200 nm or less, or about 125 nm or less). Preferably, the fumed alumina has an average particle size of about 50 nm to about 200 nm (e.g., about 75 nm to about 125 nm). As is well known in the art, fumed alumina consists of aggregates of primary particles that are initially formed during the fuming process. The aggregates are typically resistant to degradation under mechanical forces such as high shear mixing. In this regard, the average particle size of fumed alumina refers to the diameter of the smallest sphere that encloses the aggregate particle.

The alpha alumina desirably has a particle size of about 100 nm or more (e.g., about 125 nm or more, or about 250 nm or more). Alternatively or in addition, the alpha alumina desirably has an average particle size of about 1000 nm or less (e.g., about 750 nm or less, or about 500 nm or less). Preferably, the alpha alumina has a particle size of about 125 nm to about 750 nm (e.g., about 250 nm to about 500 nm). In this regard, the average particle size of alpha alumina refers to the diameter of the smallest sphere that encloses the particle.

The silica desirably has an average particle size of about 20 nm or more (e.g., about 25 nm or more). Alternatively or in addition, the silica desirably has an average particle size of about 150 m or less (e.g., about 100 nm or less). Preferably, the silica has an average particle size of about 25 nm to about 100 nm (e.g., about 35 nm to about 90 nm). Wet-process silica such as condensation-polymerized silica is known to exist as aggregates of primary particles, which aggregates are normally stable to energy inputs from application of mechanical forces such as high-shear mixing. In this regard, the average particle size of silica refers to the diameter of the smallest sphere that encloses the aggregate particle.

The polishing composition can contain a mixture of fumed alumina, alpha alumina, and silica in any suitable ratio. The polishing composition desirably contains about 3 wt. % or less (e.g., about 2 wt. % or less) of the combination of fumed alumina and alpha alumina. Alternatively or in addition, the polishing composition desirably contains about 0.01 wt. % or more (e.g., about 0.05 wt. % or more) of fumed alumina, about 0.01 wt. % or more (e.g., about 0.05 wt. % or more) of alpha alumina, and about 0.01 wt. % or more (e.g., about 0.05 wt. % or more) of condensation-polymerized silica. Preferably, the polishing composition contains about 2 wt. % or less (e.g., about 1.5 wt. % or less) of fumed alumina, about 2 wt. % or less (e.g., about 1.5 wt. % or less) of alpha alumina, and about 10 wt. % or less (e.g., about 5 wt. % or less) of condensation-polymerized silica. More preferably, the polishing composition contains about 0.2 wt. % to about 1 wt. % of fumed alumina, about 0.1 wt. % to about 1 wt. % of alpha alumina, and about 0.1 wt. % to about 4 wt. % (e.g., about 1 wt. % to about 3 wt. %) of condensation-polymerized silica.

The abrasive particles preferably are colloidally stable. The term colloid refers to the suspension of abrasive particles in the water. Colloidal stability refers to the maintenance of that suspension through time. In the context of this invention, an abrasive is considered colloidally stable if, when the abrasive is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leq 0.5$). More preferably, the value of $[B]-[T]/[C]$ is less than or equal to 0.3, and most preferably is less than or equal to 0.1.

The polishing composition contains a nonionic surfactant. In the polishing of metal surfaces, typically the edges experience higher downforce from a polishing tool. Because abrasion is in part a function of the pressure applied to the surface, the metal edges experience a faster rate of metal erosion relative to the rest of the surface. The result of such uneven polishing of the metal surface results in edge erosion, which is known in the art as rub-off or dub-off. Without wishing to be bound by any particular theory, it is believed that the nonionic surfactant is adsorbed onto the metal surface, thus forming a lubricating film that reduces the amount of edge polishing observed in the polishing of metal surfaces.

Typically, the amount of nonionic surfactant present in the polishing composition desirably is about 10 ppm or more (e.g., about 25 ppm or more, or about 50 ppm or more). Alternatively or in addition, the amount of nonionic surfactant present in the polishing composition desirably is about 1000 ppm or less (e.g., about 800 ppm or less, or about 600 ppm or less, or about 400 ppm or less, or even about 150 ppm or less). Preferably, the amount of nonionic surfactant is about 25 ppm to about 400 ppm (e.g., about 50 ppm to about 150 ppm). If the amount of nonionic surfactant is too low, then no advantage is observed with the addition of the nonionic surfactant. If the amount of nonionic surfactant is excessive, then a deleterious effect on rub-off is observed.

The nonionic surfactant can be any suitable nonionic surfactant. Suitable nonionic surfactants include copolymer surfactants comprising siloxane units, ethylene oxide units, and propylene oxide units. The structure of the aforementioned copolymer surfactants can be linear, pendant, or trisiloxane type. Preferred examples of such copolymer surfactants are commercially available as members of the SILWET™ family of surfactants having a pendant structure. The copolymer surfactant comprising siloxane units, ethylene oxide units, and propylene oxide units can have any suitable molecular weight or structure. Particularly preferred example of SILWET™ surfactants include but are not limited to SILWET™ L7622, L77, SILWET™ L7200, and SILWET™ L7602, available commercially from GE Advanced Materials (Wilton, Conn.).

The polishing composition contains an additive compound selected from the group consisting of glycine, alanine, iminodiacetic acid, maleic acid, salts thereof, and combinations thereof. Typically, the polishing composition contains about 0.8 wt. % or more (e.g., about 0.9 wt. % or more, or about 1 wt. % or more, or about 1.1 wt. % or more) of the additive compound. Preferably, the polishing composition contains about 1.5 wt. % or less (e.g., about 1.4 wt. % or less, or about 1.3 wt. % or less, or about 1.2 wt. % or less) of the additive compound. If the amount of the additive compound is too low or too high, the polishing composition does not provide reduced microwaviness when used to polish the surface of memory or rigid disks, particularly wherein the surface of the memory or rigid disks comprises nickel-phosphorous.

The polishing composition can have any suitable pH. Desirably, the polishing composition will have a pH of about 7 or less (e.g., about 6 or less). Preferably, the polishing composition will have a pH of about 1 or more (e.g., about 2 or more). More preferably, the polishing composition will have a pH of about 2 to about 5.

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be nitric acid, potassium hydroxide, or a combination thereof. The pH buffering agent can be any suitable buffering agent, for example, phosphates, sulfates, acetates, borates, ammonium salts, and the like. The polishing composition can comprise any suitable amount of a pH adjustor and/or a pH buffering agent, provided that a suitable amount of the buffering agent is used to achieve and/or maintain the pH of the polishing composition within the ranges set forth herein.

The polishing composition further contains hydrogen peroxide. The polishing composition typically comprises about 10 wt. % or less (e.g., about 8 wt. % or less, or about 6 wt. % or less) of hydrogen peroxide. The polishing composition desirably comprises about 0.1 wt. % or more (e.g., about 0.5 wt. % or more, or about 1 wt. % or more) of hydrogen peroxide. The amount of hydrogen peroxide refers to the amount of hydrogen peroxide per se present in the polishing composition. Hydrogen peroxide is commercially available as aqueous solutions of various concentrations such as 30 wt. %, 35 wt. %, and 50 wt. %. Thus, the amount of an aqueous solution of hydrogen peroxide used in the preparation of the polishing composition should be sufficient to provide an amount of hydrogen peroxide within the ranges set forth herein.

The polishing composition optionally further comprises a biocide. The biocide can be any suitable biocide, for example an isothiazolinone biocide. The amount of biocide used in the polishing composition typically is about 1 ppm to about 500 ppm, and preferably is about 10 ppm to about 200 ppm.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., fumed alumina, alpha alumina, silica, additive compound, nonionic surfactant, etc.) as well as any combination of ingredients (e.g., fumed alumina, alpha alumina, silica, additive compound, nonionic surfactant, hydrogen peroxide, optional biocide, etc.).

For example, the fumed alumina, alpha alumina, and silica can be dispersed in water. The nonionic surfactant, additive compound, and optional biocide can then be added, and mixed by any method that is capable of incorporating the components into the polishing composition. The hydrogen peroxide can be added at any time during the preparation of the polishing composition. The polishing composition can be prepared prior to use, with one or more components, such as hydrogen peroxide, added to the polishing composition just before use (e.g., within about 1 minute before use, or within about 1 hour before use, or within about 7 days before use). The polishing composition also can be prepared by mixing the components at the surface of the substrate during the polishing operation.

The polishing composition can be supplied as a one-package system comprising fumed alumina, alpha alumina, silica, a nonionic surfactant, an additive compound, optional biocide, and water. Alternatively, the fumed alumina, alpha alumina, and silica can be supplied as a dispersion in water in a first container, and a nonionic surfactant, an additive compound, and optional biocide can be supplied in a second container, either in dry form, or as a solution or dispersion in water. Furthermore, the components in the first or second container can be in dry form while the components in the other container can be in the form of an aqueous dispersion. Moreover, it is suitable for the components in the first and second containers to have different pH values, or alternatively to have substantially similar, or even equal, pH values. The hydrogen peroxide desirably is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). Other two-container, or three or more-container, combinations of the components of the polishing composition are within the knowledge of one of ordinary skill in the art.

The polishing composition of the invention also can be provided as a concentrate which is intended to be diluted with an appropriate amount of water prior to use. In such an embodiment, the polishing composition concentrate can comprise the fumed alumina, alpha alumina, silica, a nonionic surfactant, an additive compound, optional biocide, and water in amounts such that, upon dilution of the concentrate with an appropriate amount of water, each component of the polishing composition will be present in the polishing composition in an amount within the appropriate range recited above for each component. For example, the fumed alumina, alpha alumina, silica, nonionic surfactant, additive compound, and optional biocide can each be present in the concentration in an amount that is about 2 times (e.g., about 3 times, about 4 times, or about 5 times) greater than the concentration recited above for each component so that, when the concentrate is diluted with an equal volume of (e.g., 2 equal volumes of water, 3 equal volumes of water, or 4 equal volumes of water, respectively), each component will be present in the polishing composition in an amount within the ranges set forth above for each component. Furthermore, as will be understood by those of ordinary skill in the art, the concentrate can contain an appropriate fraction of the water present in the final polishing composition in order to ensure that the nonionic surfactant, additive compound, and optional biocide are at least partially or fully dissolved in the concentrate.

While the polishing composition can be prepared well before, or even shortly before, use, the polishing composition also can be produced by mixing the components of the polishing composition at or near the point-of-use. As utilized herein, the term "point-of-use" refers to the point at which the polishing composition is applied to the substrate surface (e.g., the polishing pad or the substrate surface itself). When the polishing composition is to be produced using point-of-use mixing, the components of the polishing composition are separately stored in two or more storage devices.

In order to mix components contained in storage devices to produce the polishing composition at or near the point-of-use, the storage devices typically are provided with one or more flow lines leading from each storage device to the point-of-use of the polishing composition (e.g., the platen, the polishing pad, or the substrate surface). By the term "flow line" is meant a path of flow from an individual storage container to the point-of-use of the component stored therein. The one or more flow lines can each lead directly to the point-of-use, or, in the situation where more than one flow line is used, two or more of the flow lines can be combined at any point into a single flow line that leads to the point-of-use. Furthermore, any of the one or more flow lines (e.g., the individual flow lines or a combined flow line) can first lead to one or more of the other devices (e.g., pumping device, measuring device, mixing device, etc.) prior to reaching the point-of-use of the component(s).

The components of the polishing composition can be delivered to the point-of-use independently (e.g., the components are delivered to the substrate surface whereupon the components are mixed during the polishing process), or the components can be combined immediately before delivery to the point-of-use. Components are combined "immediately before delivery to the point-of-use" if they are combined less than 10 seconds prior to reaching the point-of-use, preferably less than 5 seconds prior to reaching the point-of-use, more preferably less than 1 second prior to reaching the point of use, or even simultaneous to the delivery of the components at the point-of-use (e.g., the components are combined at a dispenser). Components also are combined "immediately before delivery to the point-of-use" if they are combined within 5 m of the point-of-use, such as within 1 m of the point-of-use or even within 10 cm of the point-of-use (e.g., within 1 cm of the point of use).

When two or more of the components of the polishing composition are combined prior to reaching the point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternatively, the mixing device can be a container-type mixing device comprising one or more inlets by which two or more components of the polishing slurry are introduced to the mixer, and at least one outlet through which the mixed components exit the mixer to be delivered to the point-of-use, either directly or via other elements of the apparatus (e.g., via one or more flow lines). Furthermore, the mixing device can comprise more than one chamber, each chamber having at least one inlet and at least one outlet, wherein two or more components are combined in each chamber. If a container-type mixing device is used, the mixing device preferably comprises a mixing mechanism to further facilitate the combination of the components. Mixing mechanisms are generally known in the art and include stirrers, blenders, agitators, paddled baffles, gas sparger systems, vibrators, etc.

The invention further provides a method of chemically-mechanically polishing a substrate comprising (i) contacting a substrate with a polishing pad and the polishing composition described herein, (ii) moving the polishing pad relative to the substrate with the polishing composition therebetween, and (iii) abrading at least a portion of the substrate to polish the substrate.

The substrate to be polished using the method of the invention can be any suitable substrate. A preferred substrate comprises at least one metal layer. Suitable substrates include, but are not limited to, memory or rigid disks, integrated circuits, metals, interlayer dielectric (ILD) devices, semiconductors, micro-electro-mechanical systems, ferroelectrics, and magnetic heads.

The metal layer can comprise any suitable metal. For example, the metal layer can comprise copper, tantalum, titanium, tungsten, aluminum, nickel, nickel-phosphorous, combinations thereof, and alloys thereof. An especially suitable metal substrate comprises nickel-phosphorous coated aluminum.

The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

Microwaviness of a substrate can be determined using any suitable technique. Examples of suitable techniques for determining the microwaviness of a substrate include optical methods such as incidence interferometry, using instruments available from, for example, Zygo Corp. (Middlefield, Conn.). In addition, microwaviness is linearly correlated with surface roughness, which can be determined using optical or physical techniques. Suitable techniques for measuring surface roughness include physical techniques such as profilometry, which employs a stylus that is contacted with the surface of a substrate and moved across the surface of the substrate. The displacement of the stylus from a reference position is recorded as a function of position on the substrate using instruments available from, for example, Veeco Instruments, Inc. (Woodbury, N.Y.), and the resulting data are used to determine the surface roughness. The value of surface roughness is used to calculate the microwaviness of the substrate.

The following examples further illustrate the invention but, of course, should not be construed as in any way limiting its scope.

EXAMPLE 1

This example demonstrates the effect of the amount of glycine on the microwaviness produced by the inventive polishing compositions in the polishing of separate substrates comprising nickel-phosphorous-coated aluminum memory disks.

Three separate substrates comprising nickel-phosphorous-coated aluminum memory disks were separately polished with three different polishing compositions. Each of the polishing compositions contained 0.2 wt. % fumed alumina with an average particle size of 100 nm, 0.8 wt. % of alpha alumina with an average particle size of 350 nm, 3.0 wt. % Bindzil 50/80 silica, 108 ppm SILWET™ L-7200 nonionic surfactant, an additive compound, and 1.2 wt. % hydrogen peroxide, at a pH of 2.4. Polishing Composition 1A (comparative) contained 0.4 wt. % glycine as the additive compound. Polishing Composition 1B (invention) contained 0.8 wt. % glycine as the additive compound. Polishing Composition 1C (invention) contained 1.2 wt. % glycine as the additive compound.

After polishing, the microwaviness of each substrate was determined, and the results summarized in Table 1.

TABLE 1

| Polishing Composition | Glycine (wt. %) | Microwaviness (Å) |
| --- | --- | --- |
| 1A (comparative) | 0.4 | 2.73 |
| 1B (invention) | 0.8 | 2.38 |
| 1C (invention) | 1.2 | 2.30 |

As is apparent from the results set forth in Table 1, increasing the amount of glycine in the polishing composition from 0.4 wt. % to 0.8 wt. % and 1.2 wt. % resulted in a decrease in microwaviness of the polished substrates of approximately 9.2% and 12%, respectively.

EXAMPLE 2

This example demonstrates the reduced microwaviness produced by use of the inventive polishing composition as compared with a prior art polishing composition in the polishing of separate substrates comprising nickel-phosphorous-coated aluminum memory disks.

Four separate substrates comprising nickel-phosphorous-coated aluminum memory disks were separately polished with four different polishing compositions. Each of the polishing compositions contained 0.2 wt. % fumed alumina with an average particle size of 100 nm, 0.8 wt. % of alpha alumina with an average particle size of 350 nm, 3.0 wt. % of Bindzil 50/80 silica, 108 ppm of SILWET™ L-7200 nonionic surfactant, an additive compound, and 1.2 wt. % of hydrogen peroxide, at a pH of 2.4. Polishing Relishing Composition 2A (comparative) contained 0.8 wt. % tartaric acid as the additive compound. Polishing Composition 2B (invention) contained 1.2 wt. % glycine as the additive compound. Polishing Composition 2C (invention) contained 0.8 wt. % alanine as the additive compound. Polishing Composition 2D (invention) contained 1.4 wt. % alanine as the additive compound.

After polishing, the microwaviness of each substrate was determined, and the results are summarized in Table 2.

TABLE 2

| Polishing Composition | Additive Compound | Microwaviness (Å) |
| --- | --- | --- |
| 2A (comparative) | 0.8 wt. % Tartaric Acid | 2.74 |
| 2B (invention) | 1.2 wt. % Glycine | 2.50 |
| 2C (invention) | 0.8 wt. % Alanine | 2.39 |
| 2D (invention) | 1.4 wt. % Alanine | 2.51 |

As is apparent from the results set forth in Table 2, the use of the inventive polishing compositions containing glycine or alanine produced a microwaviness in the polished substrate of approximately 8.4% to 13% lower than the microwaviness observed for the comparative polishing composition containing tartaric acid. In addition, a substrate polished with Polishing Composition 2D containing 1.4 wt. % alanine exhibited microwaviness approximately 5.0% greater than a substrate polished with Polishing Composition 2C containing 0.8 wt. % alanine.

EXAMPLE 3

This example demonstrates the reduced microwaviness produced by use of the inventive polishing composition as compared with a prior art polishing composition in the polishing of separate substrates comprising nickel-phosphorous-coated aluminum memory disks.

Similar substrates comprising nickel-phosphorous-coated aluminum memory disks were separately polished in successive order with six different polishing compositions. Each of the polishing compositions contained 0.2 wt. % fumed alumina with an average particle size of 100 nm, 0.8 wt. % of alpha alumina with an average particle size of 350 nm, 3.0 wt. % of Bindzil 50/80 silica, 144 ppm of SILWET™ L-7200 nonionic surfactant, an additive compound, and 1.2 wt. % of hydrogen peroxide, at a pH of 2.4. Polishing Composition 2A (comparative) contained 0.8 wt. % tartaric acid as the additive compound. Polishing Composition 2B (invention) contained 1.2 wt. % glycine as the additive compound. Polishing Composition 2C (invention) contained 0.8 wt. % maleic acid as the additive compound. Polishing Composition 2D (invention) contained 1.2 wt. % maleic acid as the additive compound. Polishing Composition 2E (invention) contained 0.8 wt. % iminodiacetic acid as the additive compound. Polishing Composition 2F (invention) contained 1.2 wt. % iminodiacetic acid as the additive compound.

Each of the substrates were polished using the same polishing pad and the same polishing parameters. The run order for the polishing experiments is set forth in Table 3. Polishing Composition 3A was used three times to serve as a control for run order. After each polishing experiment, the microwaviness of the substrate was determined, and the results summarized in Table 3.

TABLE 3

| Run | Polishing Composition | Additive Compound | Microwaviness (Å) |
| --- | --- | --- | --- |
| 1 | 3A (comparative) | 0.8 wt. % Tartaric Acid | 3.45 |
| 2 | 3B (invention) | 1.2 wt. % Glycine | 2.79 |
| 3 | 3C (invention) | 0.8 wt. % Maleic Acid | 2.82 |
| 4 | 3D (invention) | 1.2 wt. % Maleic Acid | 2.84 |
| 5 | 3A (comparative) | 0.8 wt. % Tartaric Acid | 3.08 |
| 6 | 3E (invention) | 0.8 wt. % Iminodiacetic Acid | 2.52 |
| 7 | 3F (invention) | 1.2 wt. % Iminodiacetic Acid | 2.52 |
| 8 | 3A (comparative) | 0.8 wt. % Tartaric Acid | 3.00 |

As is apparent from the results set forth in Table 3, the use of the comparative polishing composition containing tartaric acid produced a microwaviness in the polished substrate that decreased as the total number of polishing experiments using the same polishing pad increased. A substrate polished with Polishing Composition 3B containing 1.2 wt. % glycine exhibited microwaviness approximately 7% lower than the lowest microwaviness observed for comparative Polishing Composition 3A. Substrates polished with Polishing Composition 3C, containing 0.8 wt. % maleic acid, and with Polishing Composition 3D, containing 1.2 wt. % maleic acid, exhibited microwaviness approximately 6% and 5.3%, respectively, lower than the lowest microwaviness observed for comparative Polishing Composition 3A. Substrates polished with Polishing Composition 3E, containing 0.8 wt. % iminodiacetic acid, and with Polishing Composition 3F, containing 1.2 wt. % iminodiacetic acid, exhibited microwaviness approximately 15% lower than the lowest microwaviness observed for comparative Polishing Composition 3A.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition consisting essentially of:
   (a) about 0.2 to about 1 wt. % of fumed alumina,
   (b) about 0.1 to about 1 wt. % of alpha alumina,
   (c) about 0.1 to about 4 wt. % of silica,
   (d) about 10 to about 1000 ppm of a nonionic surfactant,
   (e) at least 0.8 wt. % to about 1.5 wt. % of an additive compound selected from the group consisting of glycine, alanine, iminodiacetic acid, and maleic acid,
   (f) hydrogen peroxide,
   (g) optionally a biocide, and
   (h) water.

2. The polishing composition of claim 1, wherein the fumed alumina has an average particle size of about 75 to about 125 nm, the alpha alumina has an average particle size of about 250 to about 500 nm, and the silica has an average particle size of about 25 to about 100 nm.

3. The polishing composition of claim 1, wherein the nonionic surfactant is a copolymer surfactant comprising siloxane units, ethylene oxide units, and propylene oxide units.

4. The polishing composition of claim 1, wherein the polishing composition comprises about 50 to about 150 ppm of the nonionic surfactant.

5. The polishing composition of claim 1, wherein the polishing composition comprises about 1 to about 3 wt. % of hydrogen peroxide.

6. The polishing composition of claim 1, wherein the polishing composition has a pH of about 2 to about 5.

7. The polishing composition of claim 6, wherein the polishing composition has a pH of about 2 to about 4.

8. A method of chemically-mechanically polishing a substrate comprising:
   (i) contacting a substrate with a polishing pad and a chemical-mechanical polishing composition consisting essentially of:
      (a) about 0.2 to about 1 wt. % of fumed alumina,
      (b) about 0.1 to about 1 wt. % of alpha alumina,
      (c) about 0.1 to about 4 wt. % of silica,
      (d) about 10 to about 1000 ppm of a nonionic surfactant,
      (e) at least 0.8 wt. % to about 1.5 wt. % of an additive compound selected from the group consisting of glycine, alanine, iminodiacetic acid, and maleic acid,
      (f) hydrogen peroxide,
      (g) optionally a biocide, and
      (h) water,
   (ii) moving the polishing pad and the polishing composition relative to the substrate, and
   (iii) abrading at least a portion of the substrate to polish the substrate.

9. The method of claim 8, wherein the fumed alumina has an average particle size of about 75 to about 125 nm, the alpha alumina has an average particle size of about 250 to about 500 nm, and the silica has an average particle size of about 25 to about 100 nm.

10. The method of claim 8, wherein the nonionic surfactant is a copolymer surfactant comprising siloxane units, ethylene oxide units, and propylene oxide units.

11. The method of claim 8, wherein the polishing composition comprises about 50 to about 150 ppm of the nonionic surfactant.

12. The method of claim 8, wherein the polishing composition comprises about 1 to about 3 wt. % of hydrogen peroxide.

13. The method of claim 8, wherein the polishing composition has a pH of about 2 to about 5.

14. The method of claim 13, wherein the polishing composition has a pH of about 2 to about 4.

15. The method of claim 8, wherein the substrate comprises nickel-phosphorous-coated aluminum, and at least a portion of the nickel-phosphorous is abraded to polish the substrate.

16. A chemical-mechanical polishing composition consisting essentially of:
   (a) about 0.2 to about 1 wt. % of fumed alumina,
   (b) about 0.1 to about 1 wt. % of alpha alumina,
   (c) about 0.1 to about 4 wt. % of silica,
   (d) about 10 to about 1000 ppm of a nonionic surfactant,
   (e) at least 0.8 wt. % to about 1.5 wt. % of alanine,
   (f) hydrogen peroxide,
   (g) optionally a biocide, and
   (h) water.

17. The polishing composition of claim 16, wherein the fumed alumina has an average particle size of about 75 to about 125 nm, the alpha alumina has an average particle size of about 250 to about 500 nm, and the silica has an average particle size of about 25 to about 100 nm.

18. The polishing composition of claim 16, wherein the nonionic surfactant is a copolymer surfactant comprising siloxane units, ethylene oxide units, and propylene oxide units.

19. The polishing composition of claim 16, wherein the polishing composition comprises about 50 to about 150 ppm of the nonionic surfactant.

20. The polishing composition of claim 16, wherein the polishing composition comprises about 1 to about 3 wt. % of hydrogen peroxide.

21. The polishing composition of claim 16, wherein the polishing composition has a pH of about 2 to about 5.

22. The polishing composition of claim 21, wherein the polishing composition has a pH of about 2 to about 4.

* * * * *